United States Patent
Kortum et al.

(10) Patent No.: US 7,272,549 B2
(45) Date of Patent: Sep. 18, 2007

(54) RESTORING BASE CONFIGURATION ON SOFTWARE TESTING COMPUTER

(75) Inventors: Philip T. Kortum, Austin, TX (US); Jeffrey T. Brandt, Austin, TX (US)

(73) Assignee: AT & T Knowledge Ventures, L.P., Reno, NV (US)

( * ) Notice: Subject to any disclaimer, the term of this patent is extended or adjusted under 35 U.S.C. 154(b) by 672 days.

(21) Appl. No.: 10/634,205

(22) Filed: Aug. 5, 2003

(65) Prior Publication Data

US 2005/0033564 A1   Feb. 10, 2005

(51) Int. Cl.
G06F 9/44 (2006.01)
G06F 15/177 (2006.01)

(52) U.S. Cl. ............... 703/21; 703/13; 703/22; 713/1; 713/2

(58) Field of Classification Search ............ 703/1, 703/2, 13, 21, 22; 713/1, 2
See application file for complete search history.

(56) References Cited

U.S. PATENT DOCUMENTS

| | | | |
|---|---|---|---|
| 5,469,573 A * | 11/1995 | McGill et al. | 717/127 |
| 5,694,600 A | 12/1997 | Khenson et al. | 395/652 |
| 5,907,679 A * | 5/1999 | Hoang et al. | 709/220 |
| 6,311,149 B1 | 10/2001 | Ryan et al. | 703/21 |
| 6,317,845 B1 * | 11/2001 | Meyer et al. | 714/23 |
| 6,484,308 B1 * | 11/2002 | Pearce et al. | 717/128 |
| 6,553,432 B1 * | 4/2003 | Critz et al. | 710/10 |
| 6,718,463 B1 * | 4/2004 | Malik | 713/2 |
| 6,766,476 B2 * | 7/2004 | Matsufusa | 714/38 |
| 6,944,790 B2 * | 9/2005 | Hamilton et al. | 714/6 |
| 6,973,518 B2 * | 12/2005 | Purpura | 710/104 |
| 6,986,033 B2 * | 1/2006 | Miyamoto et al. | 713/1 |
| 7,124,322 B1 * | 10/2006 | Backman | 714/15 |
| 2002/0055834 A1 | 5/2002 | Andrade et al. | 703/27 |

OTHER PUBLICATIONS

Lazenby, "Product Review QuickStart: Replication & Recovery 1.2", Linux Journal, Nov. 1998.*

* cited by examiner

*Primary Examiner*—Kamini Shah
*Assistant Examiner*—Herng-der Day
(74) *Attorney, Agent, or Firm*—Jackson Walker, L.L.P.

(57) ABSTRACT

A method of testing computer software. A test computer has a base configuration, which is imaged to a removable hard drive. The base configuration is then stored in data storage of a master computer, as a master configuration image. The software is then tested on the test computer, and after the testing, a portable boot drive is used to acquire the master image and to restore the base configuration to the test computer.

18 Claims, 1 Drawing Sheet

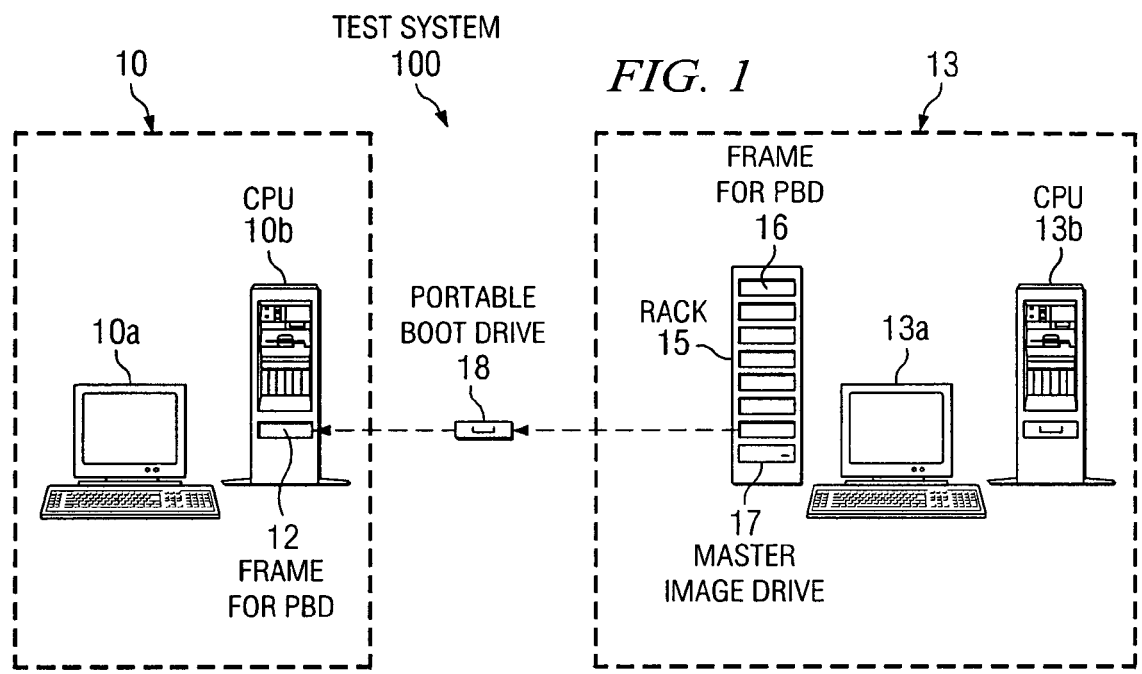
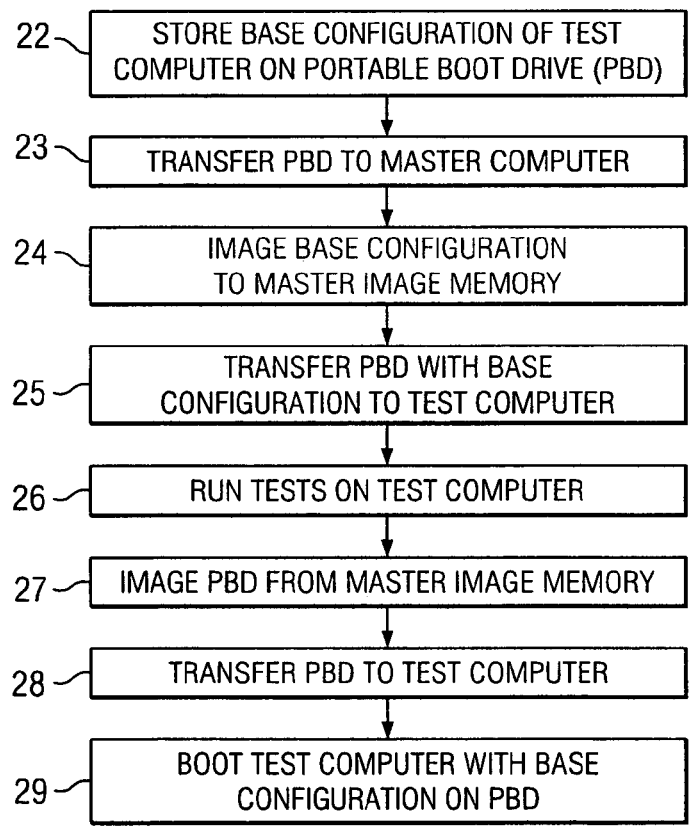

RESTORING BASE CONFIGURATION ON SOFTWARE TESTING COMPUTER

TECHNICAL FIELD OF THE INVENTION

This invention relates to computer systems, and more particularly to testing software on a computer system.

BACKGROUND OF THE INVENTION

Systems for testing computer software are widely used by quality control and human factors experts and by computing equipment developers, in their efforts to create and improve the use of computing equipment. A key element in such testing is ensuring that the testing is performed on a computer system of known configuration. It may be desired to test the same software repeatedly, with each test being performed on the same configuration. Or it may be desired to test the same software on a number of different known configurations, each new test beginning with a different, but known configuration.

The "configuration" of a computer system includes its hardware, operating system, drivers, and other software. Conventionally, maintaining a "base" configuration of a test computer system during repeated software testing may be achieved by various methods.

One conventional method for maintaining a base configuration is to install and test software on the test computer, then uninstall the software. A problem with this method is that hidden effects of the tested software can remain after the uninstall.

Another method is to partition the hard drive of the test computer. One partition stores a clean copy of the system configuration. The other partition is used during testing. After the testing, the clean configuration is copied onto the partition used during testing.

A third method is to store a clean copy of the system configuration of the test computer on removable media, such as a compact disk, prior to any testing. At the end of the test, the copy of the clean system is copied onto the hard drive of the test computer.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates a software testing system in accordance with the invention.

FIG. 2 illustrates a method of testing software in accordance with the invention.

DETAILED DESCRIPTION OF THE INVENTION

FIG. 1 illustrates a computer system 100 for testing computer software in accordance with the invention. Test system 100 has two computers, a test computer 10 and a master computer 13.

Test computer 10 includes input and output devices 10a (such as a keyboard and display), and a processing unit 10b, which includes data storage devices. The data storage associated with processing unit 10b is housed in a frame 12 and comprises a "portable boot drive" 18, defined below, which is inserted into frame 12. As explained below, the software testing is performed using test computer 10.

Portable boot drive 18 places all the performance, both speed and capacity, of a computer's main internal hard drive into a transportable package. When portable boot drive 18 is in place, access to the drive is at the front of frame 12. For purposes of the present invention, portable boot drive 18 is the primary system drive of test computer 10. In other words, portable boot drive 18 is not auxiliary storage. It is the system drive from which test computer 10 is booted and configured upon system start up.

Portable boot drive 18, upon being inserted into frame 12, conforms to the system memory protocol of test computer 10, such as by conforming to the IDE/ATA or the SCSI standards for hard disk interfaces. Frame 12 is in data communication with a controller, such as an ATA or SCSI controller (not shown) of test computer 10. When portable boot drive 18 is inserted into frame 12, frame 12 provides an interface for connecting drive 18 with test computer 10.

As an example of a portable boot drive 18, a primary system hard drive installed in today's commercially available personal computers (desktop, laptop, etc), could be removed and placed in a carrier. The portable boot drive 18 comprises the combination of the hard drive and the carrier. The carrier has appropriate interface interconnections for allowing the portable boot drive 18 to be placed into a frame of CPU 10b or rack 15. Frames 12 and 16 could also be referred to as drive "bays".

In the embodiment of FIG. 1, frame 12 is integrated in the same housing as processing unit 10b and other hardware of computer system 10. However, in other embodiments, frame 12 may be a stand alone unit.

Master computer 13 includes input and output devices 13a (such as a keyboard and display), and a processing unit 13b, which also includes data storage devices. Master computer 13 also includes a hard disk drive rack 15. Rack 15 houses at least one frame 16 for a portable boot drive 18. Thus, drive 18 is transferable between test computer 10 and master computer 13. When installed in test computer 10, drive 18 is operational to boot and run test computer 10. When installed in master computer 13, drive 18 is operational to have its contents read or written.

In the embodiment of this description, rack 15 also stores a second hard disk drive, referred to herein as a "master image memory" 17. In general, master image memory 17 may be any memory space sufficient in size to store the system configuration of test computer 10. In other embodiments, master image memory 17 could be implemented with storage internal to processing unit 13b or a wired or wireless external storage device.

Although frame 16 is shown as being in the same rack as master image memory 17, either could be a stand alone unit. Or, either or both of frame 16 and master image memory 17 could be integrated in the same housing 13b as the processing unit of computer system 13.

FIG. 2 illustrates the operation of test system 100. The example of FIG. 2 assumes that it is desired to return to the same base configuration after each test performed on test computer 10. In other embodiments, multiple base configurations could be imaged and any desired configuration selected after each test.

As explained below, portable boot drive 18 is used initially to transfer an image of the base configuration of test computer 10 to master computer 13. The same portable boot drive 18 is used again after each test session to transfer an image of the base configuration from master computer 13 back to test computer 10. Although the use of the same physical disk media is a simple way to implement the method of FIG. 2, the method could also be performed using different disk drives. Equivalent embodiments of the method could use different media for one or more of the transferring steps. In this case, each new different media is equivalent to portable boot drive 18.

It is assumed that test computer 10 is set up to a desired base configuration. In Step 22, all software representing the base configuration is stored on portable boot drive 18. Test computer is bootable from that drive 18.

In Step 23, portable boot drive 18 is transferred to one of the removable drive frames 16 of master computer 13.

In Step 24, an image of portable boot drive 18 is transferred to master image memory 17. Step 24 may be performed using commercially available disk imaging software or software as yet developed for such purposes. The disk imaging software is an application program executing on master computer 13.

A "disk image" as used herein is a copy of the hard drive. It contains the complete configuration, including the operating system, all installed programs and all data, as well as information on the disk format and structure, such as FAT, boot sector, and directories. The imaging software creates an image of the portable boot drive 18, and allows the user to restore all of the drive contents. Once the image of portable boot drive 18 is created on master drive 17, the image is not altered. In Step 25, portable boot drive 18 is replaced into the test computer 10.

As alternatives to Steps 21-25, various alternative methods could be used to transfer an image of the base configuration to master computer 13. For example, portable boot drive 18 could remain in test computer 10, and its image could be transferred using other media or using network communications. The network communications could be wired or wireless and could use serial, parallel, or packet-based data transfer. For purposes of the invention a common feature of all embodiments is that an image of at least one base configuration from test computer 10 is stored on master computer 13 prior to testing being performed on test computer 10. Thus, Steps 21-25 represent a process of storing at least one image of a portable boot drive 18 on master computer 13.

In Step 26, the software testing is performed, typically by a human operator of test computer 10. The "software testing" may be testing where the software itself is the primary focus of the test, such as a test of applications programming. The testing may be with respect to any aspect of software, such as installation of new software onto the base configuration, the selection of settings for software that is already a part of the base configuration, or the use of such software. "Software testing" may also include testing of hardware having associated software. Thus, "software testing" may include any use of software that results in a change in the base configuration of test computer 10, and the "software" being used could be applications programming as well as drivers or other software associated with hardware.

In Step 27, the portable boot drive 18 is placed into master computer 13 and has a new image from the master image drive 17 written to it, again using imaging software. As indicated above, in alternative embodiments, the same portable boot drive 18 need not be used—a second portable boot drive could be imaged from the master image and used for the subsequent steps. In this case, it should be understood that the second portable boot drive 18 could be imaged from master computer 13 at any time subsequent to Step 24 and held for later use.

In Step 28, portable boot drive 18 is transferred to test computer 10. In Step 29, test computer 10 is configured back to a base configuration, using portable boot drive 18.

In the above-described example, portable boot drive 18 is the boot drive for test computer 10. Test computer 10 is returned to its base configuration by being booted from portable boot drive 18. Thus, test computer 10 is operable in its base configuration without waiting for the base configuration to be copied to a hard drive.

A feature of the invention is that after the test computer 10 is re-imaged, it is restored to the same configuration it had prior to the software testing of Step 26. If software was installed during the testing, it is now fully removed. There is no need to identify, find, and remove hidden elements that would remain were the test software simply uninstalled.

Another feature of the invention is that there is no need for the test computer 10 to run on a partitioned drive. Thus, the test is truly representative of the computers upon which the tested software will ultimately be used.

The drive-to-drive re-imaging of Step 27 significantly reduces the time required to reinstate the configuration of test computer 10 after testing.

As an alternative to Steps 27 and 28, a batch of portable boot drives 18 could be imaged with the master image prior to testing. These are used to boot test computer 10 after each test. For a given series of tests, the time between tests would then be only the time required to swap disks. New "clean" drives are inserted as "dirty" drives are returned to master computer 13 for re-imaging.

The method of FIG. 2 can be expanded for any number of test computers 10. Referring again to FIG. 1, master computer 13 has a rack 15 that may store multiple removable drives 16. The same master image 17 may be used for a number of test computers 10. If there is more than one test computer 10, a batch of portable boot drives 18 can be imaged with a desired master image and transferred to any of the test computers after a test.

Another application of the invention is the testing of software under multiple base configurations on a single test computer 10. A number of portable boot drives 18 are used, with each acquiring an image of a different base configuration from master computer 13. For example, each removable drive might image a different operating system. After each test on test computer 10, one of the base configurations is selected and the portable boot drive 18 containing that configuration is inserted into test computer 10. By using portable boot drives 18, the different base configurations can be tested in quick succession. As an example, different base configurations might represent configurations under different operating systems. Each base configuration is "clean" in the sense that it is unaffected by subject of the testing.

What is claimed is:

1. A method of restoring a test computer to a base configuration, comprising the steps of:

storing data representing the base configuration of the test computer on a test computer portable boot drive;

creating a master image of the base configuration by copying an image of the test computer portable boot drive to storage of a master image computer;

testing a computer software on the test computer, using the base configuration on the test computer portable boot drive;

copying the master image of the base configuration onto a master image portable boot drive;

transferring the master image portable boot drive to the test computer; and booting the test computer from the master image portable boot drive, thereby restoring the test computer to the base configuration.

2. The method of claim 1, wherein the test computer portable boot drive and the master image portable boot drive are the same.

3. The method of claim 1, wherein the creating step includes transfering the test computer portable boot drive from the test to the master image computer.

4. The method of claim 1, wherein the creating step is performed by communicating the image of the test computer portable boot drive over a network from the test computer to the master image computer.

5. The method of claim 1, wherein the testing step comprises installing new software onto the test computer.

6. The method of claim 1, further comprising the steps of repeating the testing, transferring, and booting steps.

7. The method of claim 1, wherein copying the master image is performed prior to or during the testing step.

8. The method of claim 1, wherein copying the master image is repeated for a batch of portable boot drives.

9. The method of claim 1, wherein the testing step is performed by using software already part of the base configuration.

10. A method of configuring a test computer with a selected base configuration, comprising the steps of:
   storing data representing a plurality of base configurations of the test computer on test computer portable boot drives;
   creating a master image of each base configuration by copying an image of each test computer portable boot drive to storage of a master image computer;
   testing a computer software on the test computer, using one of the base configurations on one of the test computer portable boot drives;
   selecting a base configuration for subsequent software testing on the test computer;
   copying a master image of the selected base configuration onto a master image portable boot drive;
   transferring the master image portable boot drive from the master image computer to the test computer; and
   booting the test computer from the master image portable boot drive, thereby configuring the test computer with the selected base configuration.

11. The method of claim 10, wherein each base configuration represents a configuration for a different operating system of the test computer.

12. The method of claim 10, wherein the master image portable boot drive is one of the test computer portable boot drives.

13. The method of claim 10, wherein the creating step includes transferring one of the test computer portable boot drives from the test computer to the master image computer.

14. The method of claim 10, wherein the creating step is performed by communicating the image of at least one of the test computer portable boot drives over a network from the test computer to the master image computer.

15. The method of claim 10, wherein the testing step comprises installing new software onto the test computer.

16. The method of claim 10, further comprising the steps of repeating the testing, transferring, and booting steps.

17. The method of claim 10, wherein copying the master image is performed prior to or during the testing step.

18. The method of claim 10, wherein the testing step is performed by using software already part of the base configuration.

* * * * *

UNITED STATES PATENT AND TRADEMARK OFFICE
CERTIFICATE OF CORRECTION

PATENT NO. : 7,272,549 B2
APPLICATION NO. : 10/634205
DATED : September 18, 2007
INVENTOR(S) : Kortum et al.

It is certified that error appears in the above-identified patent and that said Letters Patent is hereby corrected as shown below:

On the title page (75), delete "Jeffrey T. Brandt, Austin, TX (US)" and insert therefor --Jeffrey L. Brandt, Cedar Park, TX (US)--.

In column 5, line 8, delete "transferring" and insert therefor --transferring--.

Signed and Sealed this

Twentieth Day of November, 2007

JON W. DUDAS
*Director of the United States Patent and Trademark Office*